United States Patent
Witkowski

(10) Patent No.: US 6,327,801 B1
(45) Date of Patent: Dec. 11, 2001

(54) LABEL WITH COLLECTIBLE HOLOGRAM PREMIUM

(75) Inventor: Daniel D. Witkowski, Plymouth, MN (US)

(73) Assignee: MagicCom, Minneapolis, MN (US)

( * ) Notice: Subject to any disclaimer, the term of this patent is extended or adjusted under 35 U.S.C. 154(b) by 0 days.

(21) Appl. No.: 08/801,760

(22) Filed: Feb. 18, 1997

(51) Int. Cl.$^7$ ....................................... G09F 3/00
(52) U.S. Cl. ............................... 40/306; 40/310
(58) Field of Search ................. 40/306, 310; 403/1

(56) References Cited

U.S. PATENT DOCUMENTS

| | | |
|---|---|---|
| 1,054,826 | 3/1913 | Cole . |
| 1,145,367 | 7/1915 | Herter . |
| 1,756,944 | 5/1930 | Gorton, Jr. . |
| 1,982,282 | 11/1934 | Bock . |
| 2,167,305 | 7/1939 | Kropp . |
| 2,254,545 | 9/1941 | Roberts . |
| 3,704,892 | 12/1972 | Moravick et al. . |
| 3,994,089 | 11/1976 | Schwartz ............................... 40/310 |
| 4,336,664 | 6/1982 | Penick et al. ........................... 40/594 |
| 4,634,149 | 1/1987 | Donovan . |
| 4,648,548 | 3/1987 | Shin . |
| 4,681,324 * | 7/1987 | Karabed et al. . |
| 4,913,858 | 4/1990 | Miekka et al. . |
| 5,021,110 | 6/1991 | Kobayashi . |
| 5,380,045 | 1/1995 | Comann . |
| 5,413,384 | 5/1995 | Principe et al. . |
| 5,476,194 * | 12/1995 | Hippely et al. ..................... 40/310 X |
| 5,676,401 * | 10/1997 | Witkowski et al. ................ 40/310 X |

OTHER PUBLICATIONS

Printpack: holographic labels; Prinkpack, Inc; Innovators of the Year/1994; Coverstory, Dec. 1994.*
"Hershey's dinosaur holograms roam the market", Printpack Incorporated, May 1997.*
"Consumers 'Agree': redesign a success"; Packaging World, Jan. 2000.*

* cited by examiner

Primary Examiner—Joanne Silbermann
(74) Attorney, Agent, or Firm—James A. Geppert

(57) ABSTRACT

This invention relates to the application of holographic collectible and/or play premiums positioned on consumer packaging to provide value to the advertising label stock. The holograms are integral with the labeling material such that the label has an essentially uniform thickness. The labels of this invention include a front face and a back face. In one embodiment the collectible hologram premium is provided on the front face of the label stock and in another embodiment the collectible hologram premium is provided on the back face of the label stock. The labels with the holographic premium can be trimmed to provide a collectible hologram premium with entertainment value to children or adults.

19 Claims, 5 Drawing Sheets

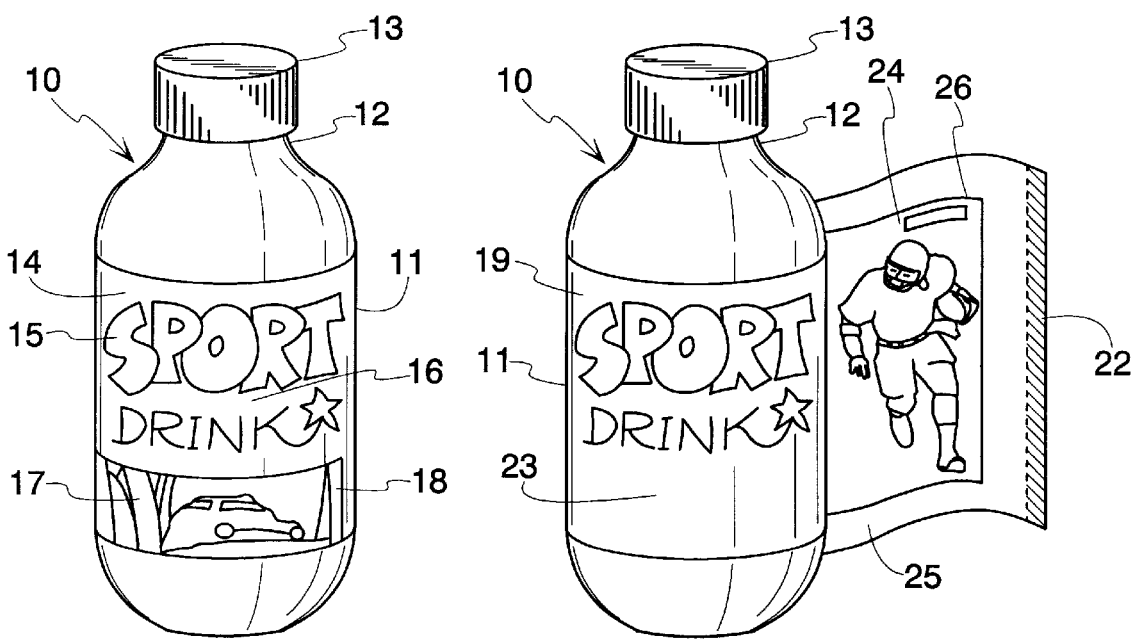
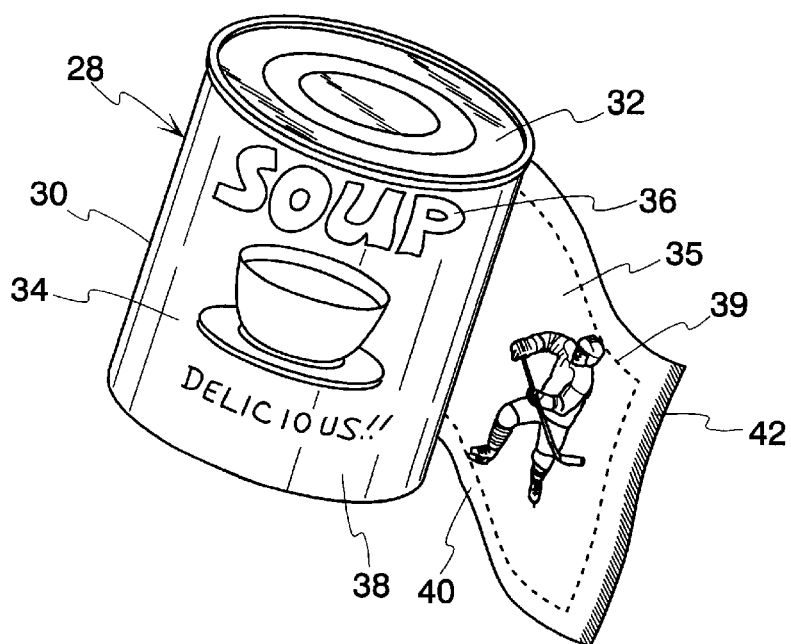
Fig. 1  Fig. 2
Fig. 3

LABEL WITH COLLECTIBLE HOLOGRAM PREMIUM

FIELD OF THE INVENTION

The invention relates to novelty items added to consumer products including food or beverage containers, wrappers and other packaging. In particular, this invention relates to holographic image premiums positioned on a food, beverage or other packaged goods labels, containers, wrappers or packages.

BACKGROUND OF THE INVENTION

Cereal companies have employed toy or other premiums inside boxes or containers to stimulate consumer interest in their products. Rings, toys, books, comics and the like have been included in boxes or affixed to food or beverage containers to add value to the purchase of a particular cereal or snack. Producers of other products such as packaged goods and foodstuffs sold in cans, bottles, cones, tubes rolls, tubs or other containers have found it difficult, expensive or otherwise impractical to add a "premium play element" or collectible value to their products because there has not been an efficient and cost effective method to consistently deliver the premium to the consumer without investing in other equipment to insert the premium into or onto a package.

Cereal boxes provide a large, dry environment for reception of a toy or other premiums, while cans, tubs, bottles and other containers do not allow for the insertion of premiums because of the potential contamination and safety hazards for consumers. To place an item on the exterior of a package traditionally has necessitated additional packaging equipment that may not otherwise be available to the packager. Production line speeds can be reduced and the reconfiguration of a manufacturing or packaging line adds time and expense to the product that devalues the added up-front costs associated with including the premium in the food product. Premiums are therefore unlikely to be added or to be used by a variety of packagers.

The backs of labels have been used to deliver coupons or special messages for consumers but they have been limited to standard printing inks and paper, with no real play or collectible value for children. The addition of each type of unique play premium to packaging labels or wrappers creates its own unique problems since the addition of pigments, or materials to the back surface of a label can raise the premium above the surface of the label material. Labels are generally dispensed from magazines or trays during assembly and the automated addition of the label to the food or beverage requires that the label sit flat and provide an essentially uniform thickness throughout to avoid reconfiguration of the labeling assembly and to maintain uniformity and accuracy in the process of adding the labels.

Holographic images are known. Despite their attraction to children and adults, holograms are virtually impossible to efficiently deliver as a collectible premium on many consumer products because of their cost in manufacture, the need for additional equipment to facilitate the addition of the hologram to a product and the rate at which the assembly process must normally be slowed to facilitate hologram placement and assembly.

In general, there are two types of holograms that are commercially available at a reduced cost. These include "hot stamp" type holograms and polyester film holograms. Both "hot-stamp" and polyester holograms present challenges when they are adapted for packaging. "Hot-stamp" holograms are stamped into rolls or sheets of a polymeric carrier film coated with metal. This synthetic film is transferred onto a substrate using a heated metal form that stamps or transfers the holographic image onto paper under the film using a combination of pressure and heat, creating a slight indentation in the area of contact between the form and the packaging. This "hot-stamping" method has been used to transfer holographic images to relatively thick substrates such as baseball cards, cereal boxes or some types of magazine covers. It is a particularly slow and expensive process. This process is not suitable for most labels or wrappers for food, beverage or other consumer product packaging because the combination of pressure and heat used in the form stamping the holograms causes the paper or material that is being stamped to "deboss" or cause an indentation in the area of the stamping. This results in an uneven stack of labels or wrappers in a tray or magazine which would prevent consistent application of the labels using rapid, automated processes. In addition, holograms prepared by "hot-stamping" run the risk of flaking or cracking from the substrate to which they have been applied. "Hot-stamped" holograms would require careful manipulation so that the "hot-stamping" method for hologram delivery onto labels that would be wrapped around or affixed to cans, bottles or other containers become impractical and virtually impossible because of the uneven nature of the "hot-stamped" label.

Polyester or other synthetic film holograms have been used for children's stickers and security devices. These film holograms are also not practical for use on consumer packaging such as a label. Heat, for example, can cause synthetic films to melt, distort, stretch, burn or jam during the packaging process. Addition of these holograms to packaging generally requires the reconfiguration of the packing or labeling equipment. Many synthetic films are more expensive than paper and the added cost of these films onto food packaging becomes economically prohibitive. In addition, the film does not have the same application properties as labels comprising paper. The films require expensive resins, solvents or hot glues for application. Films may also conduct static electricity and the film tends to curl when it is cut and placed in a tray or magazine thereby making it undesirable for automated labeling schemes. In addition, the films may be affected by the heat or cold of the cans, packages or containers as they exit the manufacturing line off of a cooker, bottling equipment, or the like. Most films are not environmentally safe since they do not readily decompose. This feature makes this product unsuitable for use on consumer packaging in several states and therefore generally precludes the use of these materials for labels or wrappers in consumer packaging destined for widespread geographic distribution.

Metallic or reflective papers have been used to create dimension for advertisement printing, for example, on beer can labeling and fish food. These printed labels include holographic prism-like patterns or other simple repeating geometric shapes that provide a repetitive reflective background and printed images can be positioned over the reflective surface. The reflective surface attracts and reflects light to create an attractive printed label. Methods for producing this paper and for producing the simple repeating geometric shapes creating a reflective hologram-like effect is disclosed in U.S. Pat. No. 4,913,858 to Mickka et al. This type of paper has little intrinsic value as a play piece or as a collectible item to the consumer or as a value added item on product identifiers and advertising.

Preferred collectible images for labels must be positioned with accuracy on the label surface to fit within the confines of the overall label. For example, a large image taking up 25% or more of the label needs to be repeatably positioned relative to the edges of the label to facilitate automation. Mickka et al., do not disclose methods to provide the positioning accuracy that would permit a single large image, for example, to be centrally positioned on a consumer product wrapper or label. It is also virtually impossible to print in register on holographic film after a registered hologram has been stamped into the material since film holograms are produced in rolls, and a second step of printing registration is difficult to control and results in tremendous waste and inefficiency. The rolls or webs that are used to stamp holograms on film are narrow, adding to the expense and inefficiency since labels are generally produced on wide web or sheet fed presses. In order to obtain a registered image, the rolls must be cut after stamping.

SUMMARY OF THE INVENTION

The present invention relates to the addition of value to a consumer package, or portion thereof through the addition of a collectible hologram premium. A collectible holographic image is integrally provided as a premium on a portion of a consumer package to increase the value of the product package or advertising. The collectible hologram premium is positioned on at least one surface of the consumer packaging for the use and enjoyment of children or adults who purchase or consume the products in the can, bottle, container or other package. In a preferred embodiment, the collectible hologram premiums are positioned on either the front or the back face of the packaging. Once the packaging containing the holographic premium is timed from the remainder of the packaging, the holograms are availabele for the use and enjoyment of a child or adult.

The holograms are stamped directly onto a metalized surface of a label prior to printing the advertising graphics related to product identification and source information. The direct stamping of the collectible image into the labeling material assures that the application equipment will not be hampered by stacks of uneven labels that bulge or stick together because of uneven "hot-stamping" over the surface of the paper. The holographic image is integral with the label and the label with the hologram has an essentially uniform thickness.

The present invention also relates to a method to produce and dispense labels that does not require any special application equipment in the manufacturing plants or changes in the manufacturing process at the canning or bottling facility. Unlike hologram images imprinted into relatively thick materials, such as cardboard or inflexible plastic sheeting, the labels of this invention do not significantly slow down the production lines, and the process is not affected by heat or cold from the cans or containers as they exit the manufacturing line and are affixed onto the container.

By producing the premium directly on the back or front surface of the label, one is assured that the premium is delivered on each and every package that moves through the packaging line. Electric eyes verify that every package is labeled on the packaging line. When premiums are independently affixed to a package, it is much more difficult to confirm that the premium is on every container. The use of a hologram premium that is integral with the label assures that the premium is delivered to each package and allows the use of about the same weight and grade of material that is currently in use in the consumer product. Little or no additional verification equipment becomes necessary and no substantial reengineering, retooling or reconfiguration of the packaging process is needed. The present invention can be incorporated into wrappers, boxes, liners, bags, trays and other containers or barriers for food or beverage or other packaged goods and products.

In a preferred embodiment of this invention a flexible label for consumer packaging is disclosed that includes a front face, visible to the consumer, comprising advertising identifying the consumer product; and a back face, wherein the label comprises at least one collectible hologram premium positioned on a reflective surface and wherein the collectible hologram premium is integral with the label. In one aspect of this embodiment, the collectible hologram premium is positioned on the front face of the label and in another aspect, the collectible hologram premium is positioned on the back face of the label. The label can further comprises trimming guidelines. Preferably there is a single hologram premium on the label but where there is more than one collectible hologram premium on the label, there is preferably less than six collectible hologram images on the label. The label can be adapted to be affixed to the consumer package and in one embodiment there is a zoned area on the label suitable for affixing the label to the consumer package.

In one aspect of this embodiment, the label is positioned on a can, canister, jar or bottle. In another aspect the label is formed as a pouch, a cylinder or a tube. The label can also be part of a stack of labels, such as would be present during the assembly process. In a preferred embodiment, the collectible hologram premium is positioned on the back face of the label behind at least a portion of the advertising. In another preferred embodiment, where the collectible hologram premium is positioned on the front face of the label, the label is affixed to cardboard consumer packaging and in one embodiment the cardboard is formed as a box. Preferably the collectible hologram premium is at least one-fourth of the area of the label.

The labels of this invention can be positioned on a variety of consumer packaging. In one embodiment, the label is positioned on a package containing a food or beverage and in another embodiment the label is positioned on a personal care product package. In another embodiment the label is positioned on a cleaning product and in another the label is positioned on audiovisual packaging.

The collectible hologram premiums can be positioned on the label as large repeating images or, preferably, the collectible hologram premium is stamped in register on the label. In one embodiment, the label is prepared from a material comprising paper and in another embodiment, the label is prepared from a printable polymeric material.

This invention also relates to a sheet comprising paper having a first surface comprising advertising related to a food or beverage and a second surface comprising a reflective material with a collectible hologram premium positioned thereon, wherein the sheet is essentially uniform in thickness. Preferably at least a portion of the sheet is removably positioned on a container housing a consumable product wherein at least a portion of the sheet forms a label for the consumer and identifies product contents or product source. Preferably the collectible hologram premium provides value to the label.

BRIEF DESCRIPTION OF THE DRAWINGS

FIG. 1 is an illustrative perspective view of a bottle having a collectible hologram premium as taught by the present invention.

FIG. 2 is a perspective view, similar to FIG. 1, with a collectible hologram premium on the back face of a label.

FIG. 3 is a perspective view, similar to FIG. 2, with a collectible hologram premium positioned on the back face of a container label.

DETAILED DESCRIPTION OF THE PREFERRED EMBODIMENTS

Figure 4:
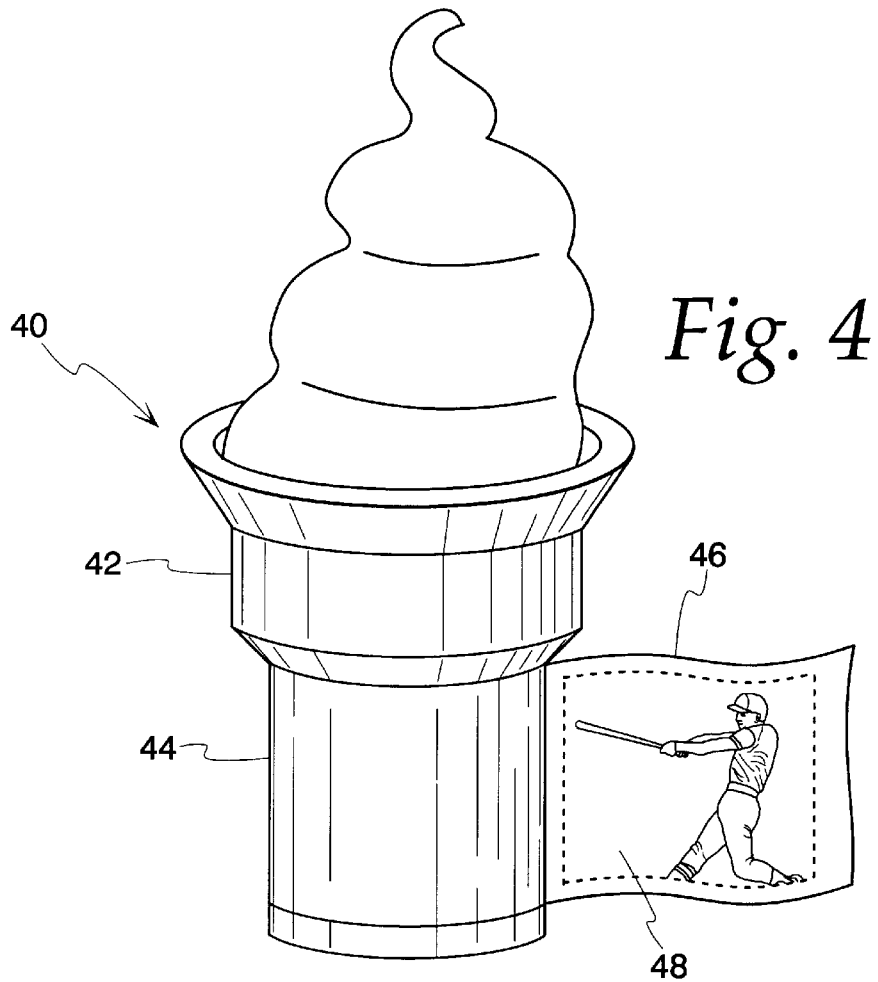
FIG. 4 is a perspective view showing an ice cream cone wrapper with a collectible hologram premium positioned on the back face of the wrapper.

The present invention relates to holograms as collectible premiums on the surface of consumer packaging to provide added value to the packaging and therefore, added value to the product contained in the packaging. The collectible premium provides an incentive for the initial and repeat purchase of the consumer product. The collectible hologram premiums are collectible novelties and are inexpensive as compared to many types of holograms.

The term "collectible hologram premium" refers to a collectible novelty hologram for collection, trade or play by children or adults that is inexpensive to produce yet adds value to consumer product labeling.

The term "label" is used herein to refer to all or a portion of a consumer package where the label includes a product identifier, a product source/manufacturer identifier, or both. Thus, the labels of this invention may include all, or a portion of a removable portion of the packaging, whether or not the removable portion is a paper label, a wrapper, or the actual packaging itself, such as a paper or polymeric film pouch. For example, the label of a can, paper or synthetic film laminated onto cardboard packaging, tubes, bottles, wrappers, pouches, tubs, and the like also serve as packaging that can incorporate the labels of this invention. Importantly, the collectible hologram premiums of this invention are integrally formed with the label material. That is, whether on the front or on the back face of the label, the collectible hologram premium is an integral portion of the advertising message and is inseparable as a layer from the material containing the advertising printing. Preferably the collectible hologram premium is incorporated onto the label so that the hologram does not add substantial thickness to the label and so that the label, overall, is of an essentially uniform thickness. Nor does the addition of the hologram add substantial variation to the length and height dimensions of the label, or of the overall packaging, again, so that additional manufacturing assembly and reconfiguration of machinery is generally not required. Moreover, the labels of this invention are prepared using a flexible material. This material can then be laminated or otherwise affixed to inflexible materials such as cardboard, inflexible plastics, and the like.

The collectible hologram premium can be added to the labeling for a variety of consumable products including, but not limited to, consumable products such as; personal care products including, but not limited to soaps, shampoos, make-up, facial tissues, paper products, insect repellents; first aid products including, but not limited to, bandages, ointments, sunscreens, and the like; cleaners, including but not limited to, detergents and sprays; audio/visual products including, but not limited to, videocassette packaging, audiocassettes, including electromagnetic tapes or compact discs, and the like; and, foodstuffs, including, but not limited to, pastas, including boxed pastas, crackers, cookies, cereals, candies, snacks including chips, pretzels, popcorn, nuts, and the like, or ice cream novelty wrappers. The collectible hologram premiums can be incorporated into labels for jars, cans, containers or bottles including, but not limited to, jams, peanut butter, vegetables, fruits, puddings, applesauce, soups, stews, meats, condiments, as well as beverages including soda, juices, sport drinks, beer, other alcoholic beverages, and the like. The collectible hologram premiums can also be included in frozen foods, including, but not limited to, frozen meal packaging, pizzas, vegetables, fruits, ice creams as well as in the packaging of concession items including popcorn, hot dog, ice cream, and peanut packaging, and the like.

The labels, as defined above, of this invention include a generally planar surface with a front face comprising advertising that includes product identifier and/or source identifier, product logos and trademarks along with a back face, or inner surface, with the back face positioned on a surface facing the packaged goods.

Referring now to the Figures, FIG. 1 discloses a beverage bottle 10 having sides 11 and a neck 12 adapted to receive a bottle top 13. An elongated label 14 is applied on the bottle to serve as advertising and includes product and/or source identifier 15 as well as logos, collectible premium-related advertising, and the like. The product and/or source identifier 15 is positioned on a front face 16 of the label (i.e., the side of the label exposed to the consumer) and the label 14 has a front face 16 and a back face (not shown). In FIG. 1, the label 14 also includes a collectible hologram premium 17 with turning guidelines 18, positioned on the front surface 16.

FIG. 2 illustrates an identical beverage container 10 having sides 11 and a neck 12 adapted to receive a bottle top 13. Again, an elongated label 19 is positioned on the container to provide advertising including product and/or source identification. The label 19 can also include product advertising logos, collectible premium advertising, and the like, on the front face of the label. Labels 14 and 19 are preferably removably affixed to the bottle 10, for example, using glued end portions 22, as provided in FIG. 2. Glued end portions 22 permit the label to be removably affixed to the bottle surface. Label 19, includes a front surface 23 and a back surface 25. An intermediate portion 24 of back surface 25 includes at least one collectible holographic premium positioned on the back surface. Removal of the label 19 and trimming of the image, for example, using guidelines 26 results in a collectible hologram premium.

FIG. 3 is similar to FIGS. 1 and 2, in that a label is affixed to a consumer product; however, the container of FIG. 3 is a metallic container or can 28 to house consumable goods including soups, stews, meats, vegetables, pet foods, and the like. The can is formed generally as a cylinder with straight sides 30, a top 32 and bottom (not shown). A removable label 34 is positioned on the can and, like the labels of FIG. 1 and 2, the label 34 of FIG. 3 includes product and/or source identifier information 36 on the front face 38 and can also include product advertising logos, collectible premium advertising, and the like. In the embodiment of FIG. 3, like the container of FIG. 2, at least one collectible hologram premium 35 is positioned on the back face 40 of the label. Optionally, trimming guidelines 39 surround the collectible hologram premium.

The ends of the label 34 preferably include an area or zone 42 for gluing or otherwise securing the label 34 to the container 28. The labels of this invention can be applied to a variety of canned goods or goods in canisters and a variety of sizes of canned goods or goods in canisters are contemplated in this invention.

In yet another embodiment of this invention, the hologram play premiums are positioned on the wrappers of concession-type food items. In one aspect of this embodiment, provided in FIG. 4, a label, in the form of a sanitary wrapper 46 is positioned around an ice cream cone, either premade frozen cones or cones separately availabele for the addition of ice cream. FIG. 4 illustrates the use of the label of this invention wrapped around an ice cream cone with the collectible hologram premium positioned on the back face of the label. The ice cream cone 40 includes cone 42 with grip portion 44. The cone grip portion 44 comprises a label 46 wrapped around the grip portion 44 and the label 46 includes a hologram play premium 48 positioned on the label. Preferably, at least two edges of the label are provided with glue or other means to secure or otherwise affix the label edges to each other to position the label on the grip portion 44 of the cone 42.

Figure 5:
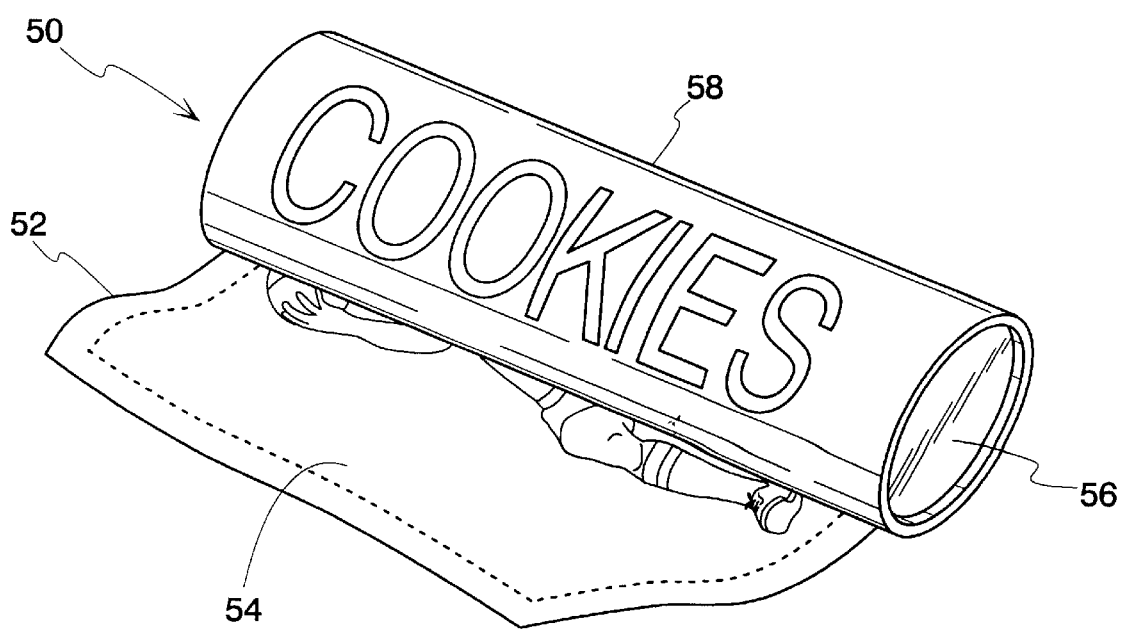
FIG. 5 is a perspective view showing a cookie tube with a collectible hologram premium positioned on the back face of the wrapper.

FIG. 5 illustrates the label of this invention applied to a cookie tube wrapper. Similarly, the wrapper of this invention could be positioned over refrigerator doughs including, but not limited to, cookie, roll, biscuit doughs, and the like. The wrapper could be positioned around other cylindrically shaped packaging such as rolls of cookies, canisters of snacks, or the like. In the embodiment of FIG. 5, a cylindrical tube 50 includes a removable label 52 with a collectible hologram play premium 54 positioned on the label. The label of cylindrical tube 50 is peelably removed from the packaging to separate the hologram play premium 54 from the tube 50. The embodiment of FIG. 5 includes ends 56 and sides 58. Ends 56 of FIG. 5 are generally circular; such as is found in some refrigerated doughs or in packages of snacks, such as tubular shaped canisters of potato chips or other snacks, but this invention also contemplates cylindrical-type tube packaging with other ends, including crimped ends, such as are found in packages of refrigerated dough.

Figure 6:
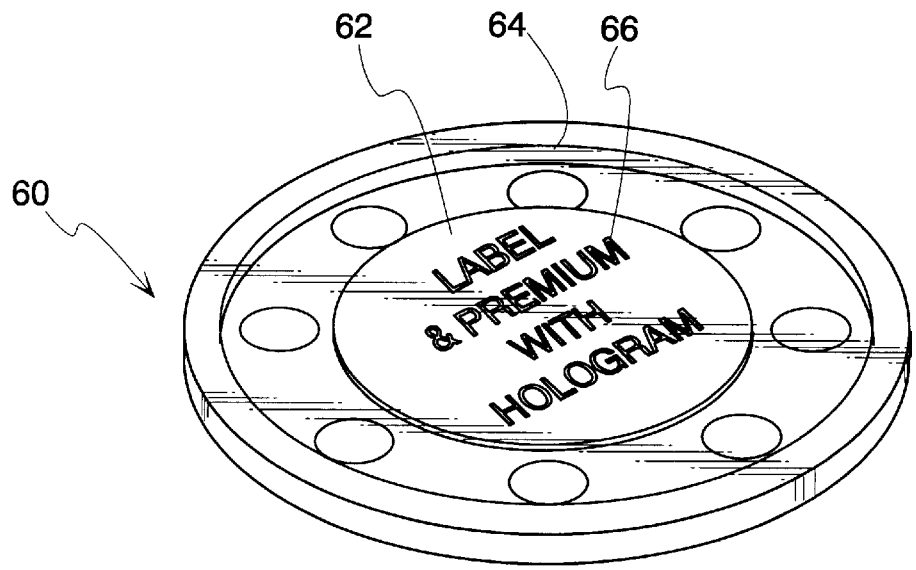
FIG. 6 is a perspective view showing a pizza label containing a collectible hologram premium according to this invention.

In another aspect of this invention, the labels of this invention are applied to frozen foods including frozen pizzas, and the like. In one aspect of this embodiment, provided in FIG. 6, a label 62 is included in a pizza package 60. The hologram play premium is included in a label that is preferably included within transparent packaging 64. The label 62 is preferably positioned over the pizza and includes advertizing 66 that is visible to the consumer. In one embodiment, the collectible hologram premium is positioned on the front surface of the label and in another embodiment the collectible hologram premium is positioned on the back surface of the label 62. While the label 62 of FIG. 6 is in packaging containing pizza, those of ordinary skill in the art recognize that the label could be included behind transparent packaging for any of a variety of consumer products.

Figure 7:
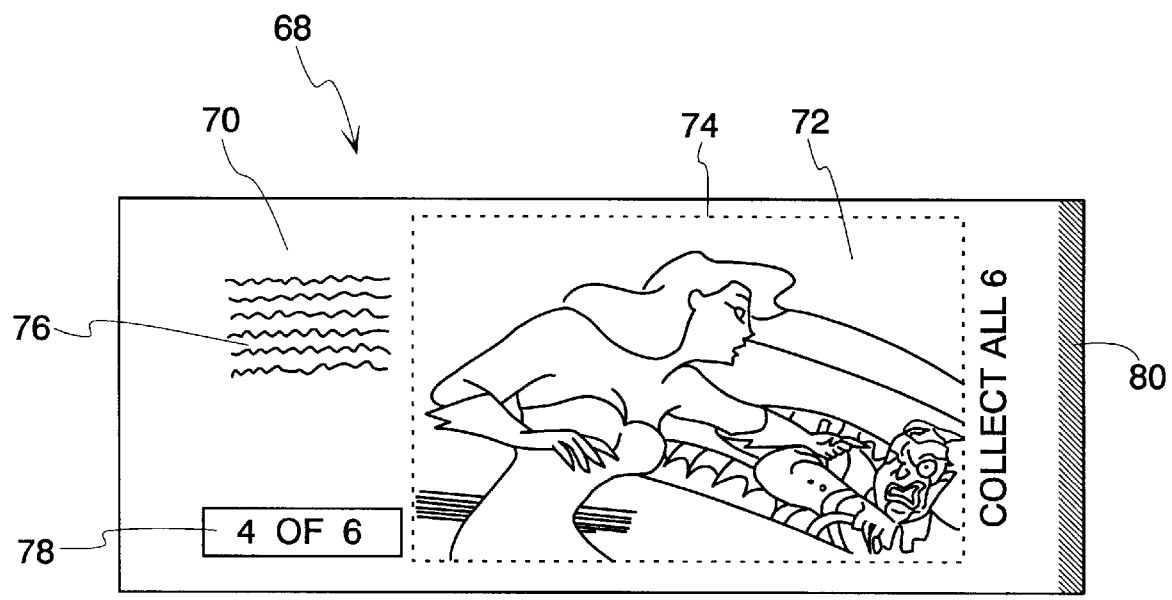
FIG. 7 is a perspective view of a collectible hologram premium of this invention positioned on the back face of a label.

FIG. 7 is a top plan view of a label of this invention with a collectible hologram premium positioned on the internal surface of the label. FIG. 7 illustrates a label 68 with a back face 70 having a collectible hologram premium 72 positioned on an intermediate portion of the back face 70. Preferably, the collectible hologram premium includes trimming guidelines 74. In one embodiment, the label can optionally include a written description 76 adjacent the hologram and in another embodiment the hologram novelty premium is one in a series of collectible novelty premiums with the number of that collectible premium 78 denoted on the label. In a preferred embodiment, at least one area 80 is positioned on the label to secure the label 68 on the package surface. In one aspect of this embodiment, as provided in FIG. 7, glue areas are provided at opposite ends of the label and a central area intermediate to the glued areas includes at least one hologram premium according to this invention. Those of ordinary skill in the art will recognize that there are a variety of methods for affixing a label to consumer packaging without detracting from the scope of this invention.

Figure 8:
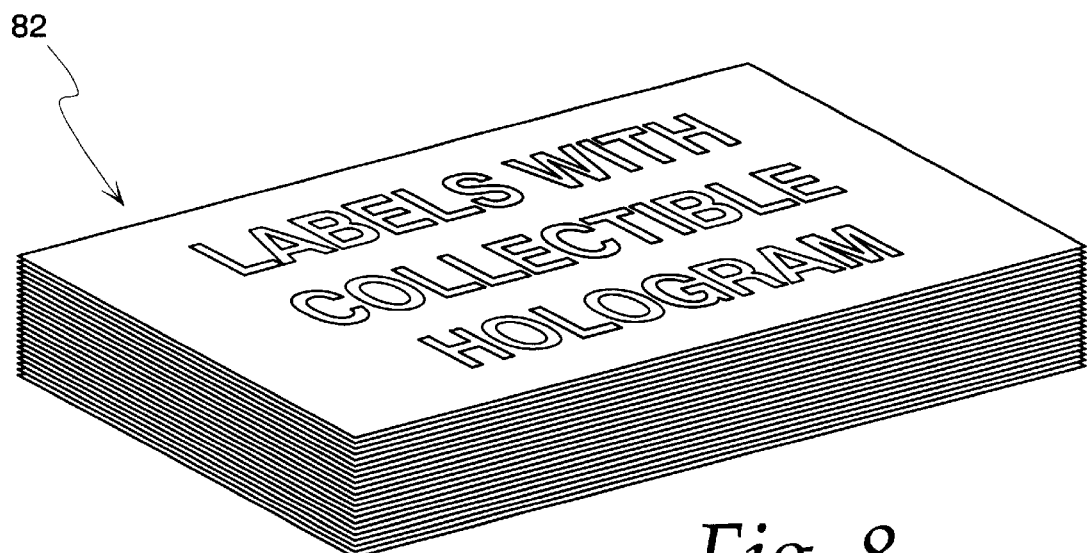
FIG. 8 is a perspective view of a stack of labels with collectible hologram premiums suitable for automated assembly onto consumer packaging.

FIG. 8 is a perspective view of a stack of labels 82 that incorporate the hologram play premium of this invention. The stack of labels 82 is provided in a stackable form for a magazine or tray suitable for loading onto machinery capable of applying the labels to a container or package. In the embodiment of FIG. 8, the collectible hologram premium is provided on the back face of each label; those skilled in the art will recognize that the collectible hologram premium can also be positioned on the front face of the label. Importantly, the holographic images on the label do not add substantial thickness to the label. Importantly, the presence of the hologram does not detract from the essentially uniform thickness of the label. This permits the labeling, with the collectible premium, to be added to the consumer packaging without substantial reconfiguration, manipulation of existing packaging and labeling equipment. That is, the labeling machinery does not have to be substantially modified to accommodate overall increased label thickness. Therefore, the collectible hologram premiums can be added to a variety of labels without added expense or time in the product packaging process.

Essentially uniform thickness is important to the automated labeling process. A uniform thickness assures that the application equipment, for example, in the form of a magazine or tray will not be hampered by stacks of uneven labels that bulge or stick together because of uneven spot "hot-stamping" of holograms or due to static electricity caused by synthetic materials. The stack of labels 82 illustrates the overall uniform thickness of the individual labels.

Figure 9:
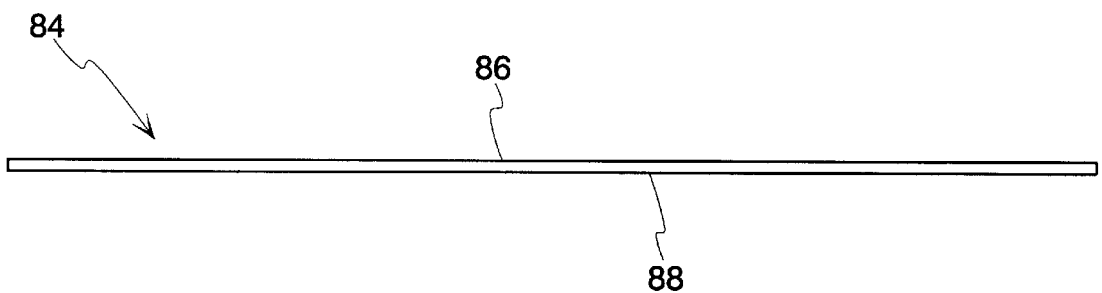
FIG. 9 is a side view of a preferred label having a coating of reflective material on at least one side of the label.

FIG. 9 is a cross-sectional view of a label 84 of this invention. In the embodiment of this invention where the collectible hologram premium is positioned on the back face of the label, the label preferably includes a front face 86 and a back face 88. Advertising, including product identifiers and commercial source identifiers are preferably positioned at least on the front face 86 of the label 84. The collectible hologram premium is visualized on the back face 88 of label 84 and, again, as discussed above, the overall thickness of label 84 is substantially uniform.

Figure 10:
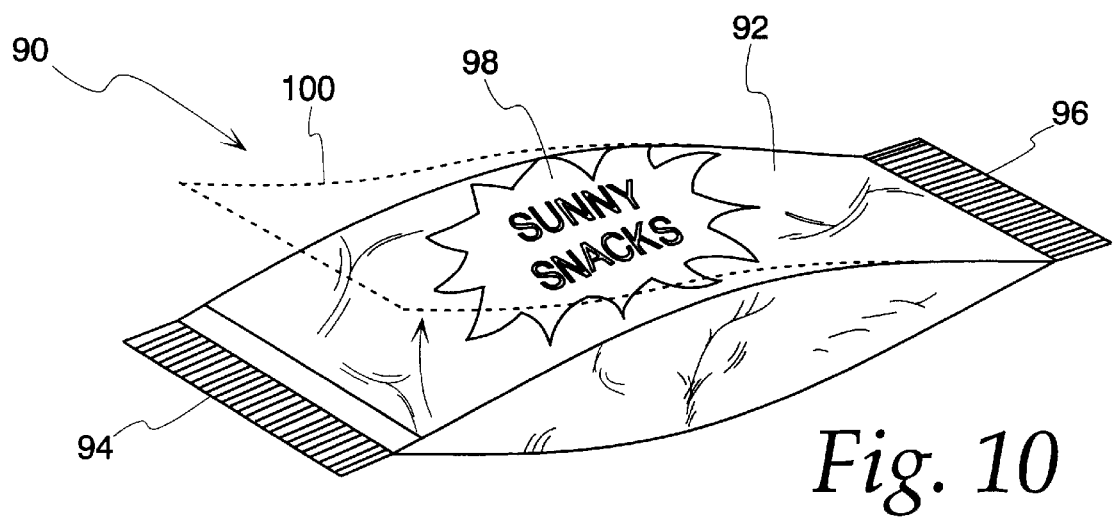
FIG. 10 is a perspective view of a pouch-type package with a collectible hologram premium positioned on the back face of a portion of the package.

FIG. 10 is another embodiment of the present invention. Here, pouch 90 includes a front 92 and back (not shown) and is equipped to enclose candies, seeds, snacks, and the like.

Crimps or sealed portions 94 and 96 keep the candies, or the like, from escaping the sealed pouch 90. The pouch 90 is generally prepared from a material comprising paper or a printable, flexible, polymeric product and front 92 preferably includes advertising 98 such as product and/or source identifiers. In the embodiment of FIG. 10, the collectible hologram premium is positioned on the inside face of front 92; however, it is understood that the collectible hologram premium could extend around all or a portion of the inside face of the pouch. The emptied pouch can be trimmed, such as by cutting along dotted lines 100, marked on the internal or external surface of the pouch, to provide a collectible hologram premium of this invention.

Figure 11:
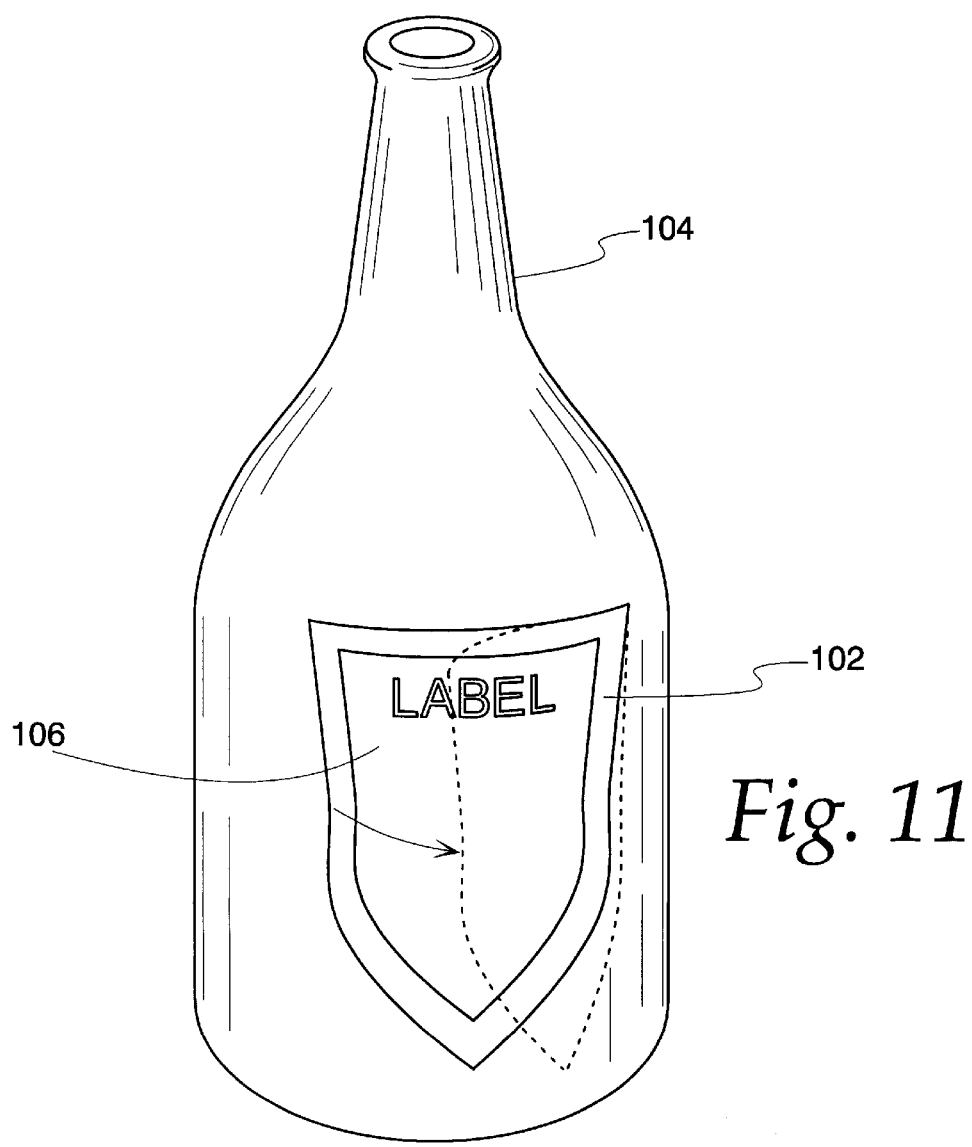
FIG. 11 is a perspective view of a bottle with a shaped label having a collectible hologram premium positioned on the back face of the label.

FIG. 11 provides a label 102 positioned on a portion of a surface of a bottle 104, or other consumer product, where label 102 is die-cut or otherwise shaped in an attractive configuration, such as a geometric shape, a shield or another form. Label 102 is removably affixed to the bottle 104, or other consumer product and can include a collectible hologram premium on the front face 106 or back face (not shown). The front face 106 of the label preferably includes advertising including product identification and source information. In the label 102 of FIG. 11, the collectible hologram premium is positioned on the back face of the label.

The collectible hologram premiums of this invention can include a variety of figures including cartoon characters, action figures, sports personalities, artist renditions, and the like, that are attractive to children, adults, or both. The labels of this invention can include one or more holograms positioned on the surface of the label. Preferably the holograms are positioned on the consumer label "in register" meaning that the holographic image is consistently and repeatably positioned on the label in substantially the same location. Holograms can be printed as repeating patterns on a label surface but a preferred embodiment of this invention contemplates that one or more images will be discretely positioned on the surface of the label to guarantee that each label received contains an image positioned in the desired location. This permits the image to be positioned relative to particular advertising information and the collectibility of the image then enhances the advertising value of the label since the advertising is preferably retained with the collected image. When the image is trimmed from the label, preferably, the collectible image is integral with at least a portion of the advertising on the label so that the advertising portion of the label is retained and thereby has added advertising value, creating incentive for the producer to incorporate this type of premium on the container label.

The collectible hologram premiums of this invention can be prepared using a variety of processes known in the art. A preferred method of manufacture combines the methods of U.S. Pat. No. 4,913,858 onto a material suitable for labeling with the disclosure of this invention. In a preferred method, the labeling material, either paper, a polymeric labeling material, or the like, is imprinted or stamped with an image. All, or a portion, of the labeling material is then coated on one or both sides with a reflective coating. As noted above, preferably the image is stamped into the labeling material, preferably in register. The labeling material is then printed with the necessary product identifier information, trademarks, product source information, and the like, at least on the front facing portion of the labeling material. Preferably, following printing the labeling material is cut into individual labels suitable for assembly into a consumer product.

The collectible hologram premium is readily removable from the consumer packaging when the consumer product is purchased. Cutting guidelines can be positioned on the front face of the labeling to aid in the removal of the label from the consumer product without destroying the collectible hologram premium. Trimming guidelines are preferably positioned around the premium to assist in triming the label when the label is removed from the consumer package.

The premiums have value as collectible items that preferably incorporate consumer product advertising onto at least a portion of one surface of the premium. The holographic images can be used as miniature posters or book marks. The holographic play premiums can be folded for stand-up display, mounted on supports, framed, collected and traded. The holograms can be used as paper airplanes or game pieces. They can be used to decorate papers, bags, school books, and the like.

All references and publications cited herein are expressly incorporated by reference into this disclosure. Particular embodiments of this invention have been discussed in detail and reference has been made to possible variations within the scope of this invention. It will be appreciated by those skilled in the art that while the invention has been described above in connection with particular embodiments, the invention is not necessarily so limited and that numerous other embodiments, uses, modifications and departures from the embodiments, examples and uses may be made without departing from the inventive scope of this application which is limited only by the spirit of this disclosure and by the claims as provided below.

What is claimed is:

1. A flexible label, wrapper or package for consumer or commercial products capable of application to flat, shaped or curved surfaces, comprising:

a first layer of a thin flexible subtrate having a front face, visible to the consumer, which may include information for the consumer applied thereto;

a second layer of a thin flexible substrate having a back face, wherein the first layer and the second layer are coextensive with one another such that the label has a substantially uniform thickness; and wherein the label comprises at least one collectible hologram premium integral with either face of the label and having an essentially uniform thickness, said label further having an outline defining the collectible hologram.

2. The label of claim 1, wherein there is more than one collectible hologram premium on the label.

3. The label of claim 1 wherein the at least one collectible hologram comprises a plurality of collectible holograms.

4. The label of claim 1, wherein the flexible label comprises a stack of labels.

5. The label of claim 1, wherein the collectible hologram premium is positioned on the back face and behind at least a portion of the advertising.

6. The label of claim 1 wherein the area occupied by the collectible hologram premium is at least one-fourth of the area of the label.

7. The label of claim 1, wherein the hologram is formed on a reflective portion of the label.

8. The label of claim 1 wherein the collectible hologram premium is stamped in register on the label.

9. The label of claim 1, wherein the label is prepared from a material comprising paper.

10. The article label of claim 1, wherein the label is prepared from a printable polymeric material.

11. A flexible label, wrapper or package for consumer or commercial products capable of application to flat, shaped or curved surfaces, comprising:

a first layer of a thin flexible substrate having a front face, visible to the consumer, which may include information for the consumer applied thereto;

a second layer of a thin flexible substrate having a back face, wherein the first layer and the second layer are coextensive with one another such that the label has a substantially uniform thickness; and wherein the label comprises at least one collectible hologram premium integral with either face of the label and having an essentially uniform thickness;

said label further comprising trimming guidelines proximate the collectible hologram.

12. A flexible label, wrapper or package for consumer or commercial products capable of application to flat, shaped or curved surfaces, comprising:

a first layer of a thin flexible substrate having a front face, visible to the consumer, which may include information for the consumer applied thereto;

a second layer of a thin flexible substrate having a back face, wherein the first layer and the second layer are coextensive with one another such that the label has a substantially uniform thickness;

wherein the label comprises at least one collectible hologram premium integral with either face of the label and having an essentially uniform thickness; and wherein the back face of the label is zoned to provide an area that affixes the label to the consumer package.

13. A flexible label, wrapper or package for consumer or commercial products capable of application to flat, shaped or curved surfaces, comprising:

a first layer of a thin flexible substrate having a front face, visible to the consumer, which may include information for the consumer applied thereto;

a second layer of a thin flexible substrate having a back face, wherein the first layer and the second layer are coextensive with one another such that the label has a substantially uniform thickness; and wherein the label comprises at least one collectible hologram premium integral with either face of the label and having an essentially uniform thickness, said label being applied on a can, canister, jar, bottle or package.

14. A flexible label, wrapper or package for consumer or commercial products capable of application to flat, or curved surfaces, comprising:

a first layer of a thin flexible substrate having a front face, visible to the consumer, which may include information for the consumer applied thereto;

a second layer of a thin flexible substrate having a back face, wherein the first layer and the second layer are coextensive with one another such that the label has a substantially uniform thickness; and wherein the label comprises at least one collectible hologram premium integral with either face of the label and having an essentially uniform thickness, said label being formed as a pouch, a cylinder, a package or a tube.

15. A flexible label, wrapper or package for consumer or commercial products capable of application to flat, shaped or curved surfaces, comprising:

a first layer of a thin flexible substrate having a front face, visible to the consumer, which may include information for the consumer applied thereto;

a second layer of a thin flexible substrate having a back face, wherein the first layer and the second layer are coextensive with one another such that the label has a substantially uniform thickness; and wherein the label is affixed to cardboard consumer packaging and the label comprises a plurality of collectible hologram premiums integral with the label.

16. The label of claim 15 wherein the cardboard is formed as a box.

17. A flexible label, wrapper or package for consumer or commercial products capable of application to flat, shaped or curved surfaces, comprising:

a first layer of a thin flexible substrate having a front face, visible to the consumer, which may include information for the consumer applied thereto;

a second layer of a thin flexible substrate having a back face, wherein the first layer and the second layer are coextensive with one another such that the label has a substantially uniform thickness; and wherein the label comprises at least one collectible hologram premium integral with either face of the label and having an essentially uniform thickness, the label being positioned on a package containing a food, beverage or commercial product.

18. A flexible label, wrapper or package for consumer or commercial products capable of application to flat, shaped or curved surfaces, comprising:

a first layer of a thin flexible substrate having a front face, visible to the consumer, which may include information for the consumer applied thereto;

a second layer of a thin flexible substrate having a back face, wherein the first layer and the second layer are coextensive with one another such that the label has a substantially uniform thickness; and wherein the label comprises at least one collectible hologram premium integral with either face of the label and having an essentially uniform thickness, the label being positioned on a personal care product package.

19. A flexible label, wrapper or package for consumer or commercial products capable of application to flat, shaped or curved surfaces, comprising:

a first layer of a thin flexible substrate having a front face, visible to the consumer, which may include information for the consumer applied thereto;

a second layer of a thin flexible substrate having a back face, wherein the first layer and the second layer are coextensive with one another such that the label has a substantially uniform thickness; and wherein the label comprises at least one collectible hologram premium integral with either face of the label and having an essentially uniform thickness, the label being positioned on audiovisual packaging.

* * * * *